United States Patent
Farkas et al.

(10) Patent No.: US 12,199,797 B1
(45) Date of Patent: Jan. 14, 2025

(54) SYSTEMS AND METHODS FOR IMPLEMENTING SMART CABLES

(71) Applicant: Dell Products L.P., Round Rock, TX (US)

(72) Inventors: Sandor T. Farkas, Round Rock, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/448,500

(22) Filed: Aug. 11, 2023

(51) Int. Cl.
*H04L 25/02* (2006.01)
*H01B 11/08* (2006.01)

(52) U.S. Cl.
CPC .......... *H04L 25/0272* (2013.01); *H01B 11/08* (2013.01)

(58) Field of Classification Search
CPC ........... H04L 25/03885; H04L 25/0272; H04L 25/0274; H04L 25/0276; H04L 25/0278; H04L 25/03006; H04L 2025/03433; H04L 25/03343; H04L 25/03878; H04L 25/08; H04L 25/085; H01B 11/08
See application file for complete search history.

(56) References Cited

U.S. PATENT DOCUMENTS

| | | | | |
|---|---|---|---|---|
| 8,272,023 B2 * | 9/2012 | Horan | ................... | H04L 25/242 |
| | | | | 725/127 |
| 2007/0164802 A1* | 7/2007 | Rea | ......................... | H03F 3/505 |
| | | | | 327/266 |
| 2007/0204194 A1* | 8/2007 | Grise | ............... | G01R 31/31727 |
| | | | | 714/738 |
| 2008/0109180 A1* | 5/2008 | Keady | ................... | H04L 25/242 |
| | | | | 702/89 |
| 2022/0123972 A1* | 4/2022 | Chen | ................. | H04L 25/03866 |

\* cited by examiner

*Primary Examiner* — Khanh C Tran
(74) *Attorney, Agent, or Firm* — Jackson Walker L.L.P.

(57) ABSTRACT

A cable may include a first signal path for communicating a first polarity signal of a differential signal, a second signal path for communicating a second polarity signal of the differential signal, a first deskewer integral to the first signal path and configured to vary a first propagation delay of the first signal path, a second deskewer integral to the second signal path and configured to vary a second propagation delay of the second signal path, attenuators configured to apply an attenuation to the first signal path and the second signal path, and a circuit formed as a part of the cable and communicatively coupled to the first signal path, the second signal path, the first deskewer, the second deskewer, the attenuators, and configured to, based on analysis of the first polarity signal and the second polarity signal, control the first propagation delay, the second propagation delay, and the attenuation.

21 Claims, 3 Drawing Sheets

SYSTEMS AND METHODS FOR IMPLEMENTING SMART CABLES

TECHNICAL FIELD

The present disclosure relates in general to information handling systems, and more particularly to methods and systems for implementing an active smart cable which improves electrical performance of an electrical channel implemented by the cable.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to imperfections in circuit boards, connectors, connector/cable assemblies, and bulk cable, signals may suffer from one or more signal imperfections, including without limitation skew, common-mode noise, capacitive crosstalk, and frequency-dependent loss. As communication bandwidths through cables increase, the significance of such imperfections can significantly affect signal integrity. Accordingly, systems and methods for correcting or compensating for such imperfections may be desirable.

SUMMARY

In accordance with the teachings of the present disclosure, the disadvantages and problems associated with signal imperfections in differential signals may be reduced or eliminated.

In accordance with embodiments of the present disclosure, a cable may include a first signal path for communicating a first polarity signal of a differential signal, a second signal path for communicating a second polarity signal of the differential signal, a first deskewer integral to the first signal path and configured to vary a first propagation delay of the first signal path, a second deskewer integral to the second signal path and configured to vary a second propagation delay of the second signal path, a first attenuator integral to the first signal path and configured to apply an attenuation to the first signal path, a second attenuator integral to the second signal path and configured to apply the attenuation the second signal path, and a circuit formed as a part of the cable and communicatively coupled to the first signal path, the second signal path, the first deskewer, the second deskewer, the first attenuator, and the second attenuator, and configured to, based on analysis of the first polarity signal and the second polarity signal, control the first propagation delay, the second propagation delay, and the attenuation.

In accordance with these and other embodiments of the present disclosure, a system may include a transmitter, a receiver, and a cable communicatively coupled between the transmitter and the receiver and comprising a first signal path for communicating a first polarity signal of a differential signal from the transmitter to the receiver, a second signal path for communicating a second polarity signal of the differential signal from the transmitter to the receiver, a first deskewer integral to the first signal path and configured to vary a first propagation delay of the first signal path, a second deskewer integral to the second signal path and configured to vary a second propagation delay of the second signal path, a first attenuator integral to the first signal path and configured to apply an attenuation to the first signal path, a second attenuator integral to the second signal path and configured to apply the attenuation to the second signal path, and a circuit formed as a part of the cable and communicatively coupled to the first signal path, the second signal path, the first deskewer, the second deskewer, the first attenuator, and the second attenuator, and configured to, based on analysis of the first polarity signal and the second polarity signal, control the first propagation delay, the second propagation delay, and the attenuation.

In accordance with these and other embodiments of the present disclosure, a method may be provided for a cable having a first signal path for communicating a first polarity signal of a differential signal from a transmitter to a receiver, a second signal path for communicating a second polarity signal of the differential signal from the transmitter to the receiver, a first deskewer integral to the first signal path and configured to vary a first propagation delay of the first signal path, a second deskewer integral to the second signal path and configured to vary a second propagation delay of the second signal path, a first attenuator integral to the first signal path and configured to apply an attenuation to the first signal path, and a second attenuator integral to the second signal path and configured to apply the attenuation to the second signal path. The method may include controlling, based on analysis of the first polarity signal and the second polarity signal, with a circuit formed as a part of the cable and communicatively coupled to the first signal path, the second signal path, the first deskewer, the second deskewer, the first attenuator, and the second attenuator: the first propagation delay, the second propagation delay, and the attenuation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
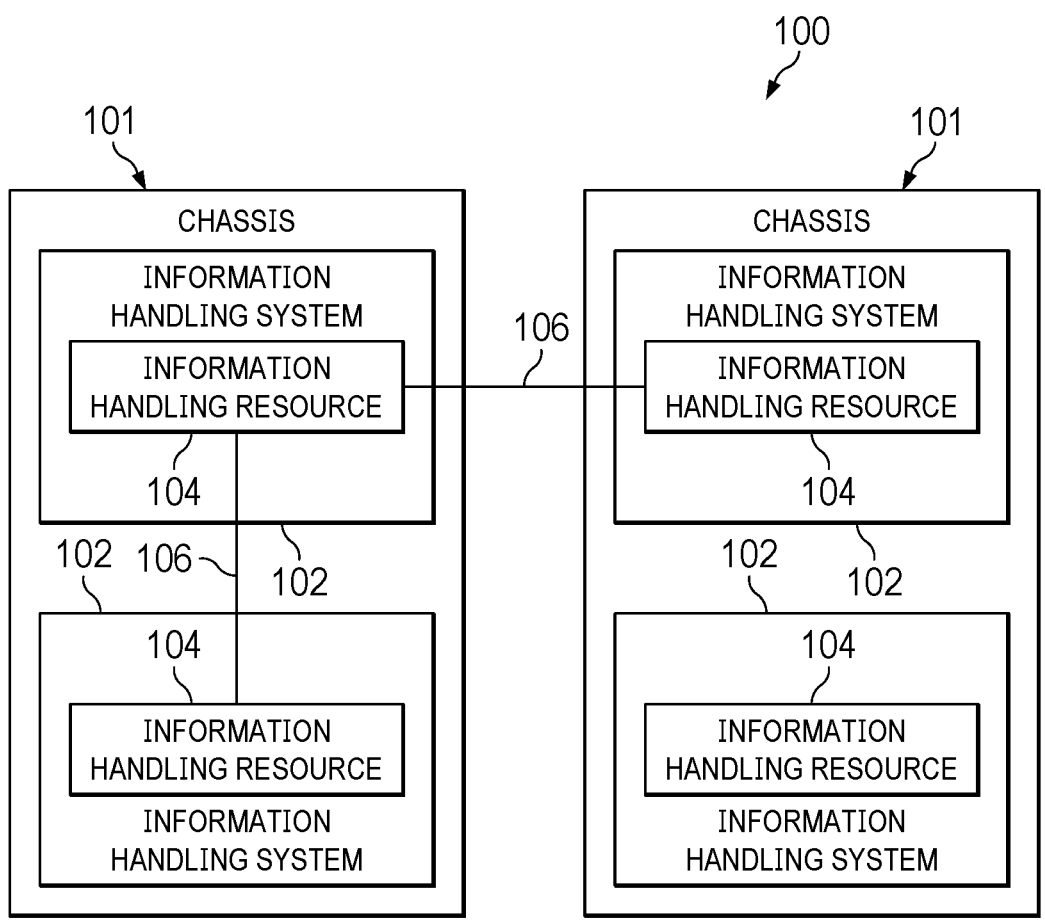
FIG. 1 illustrates a system comprising a plurality of chassis, each chassis comprising at least one information handling system, in accordance with embodiments of the present disclosure.
Figure 2:
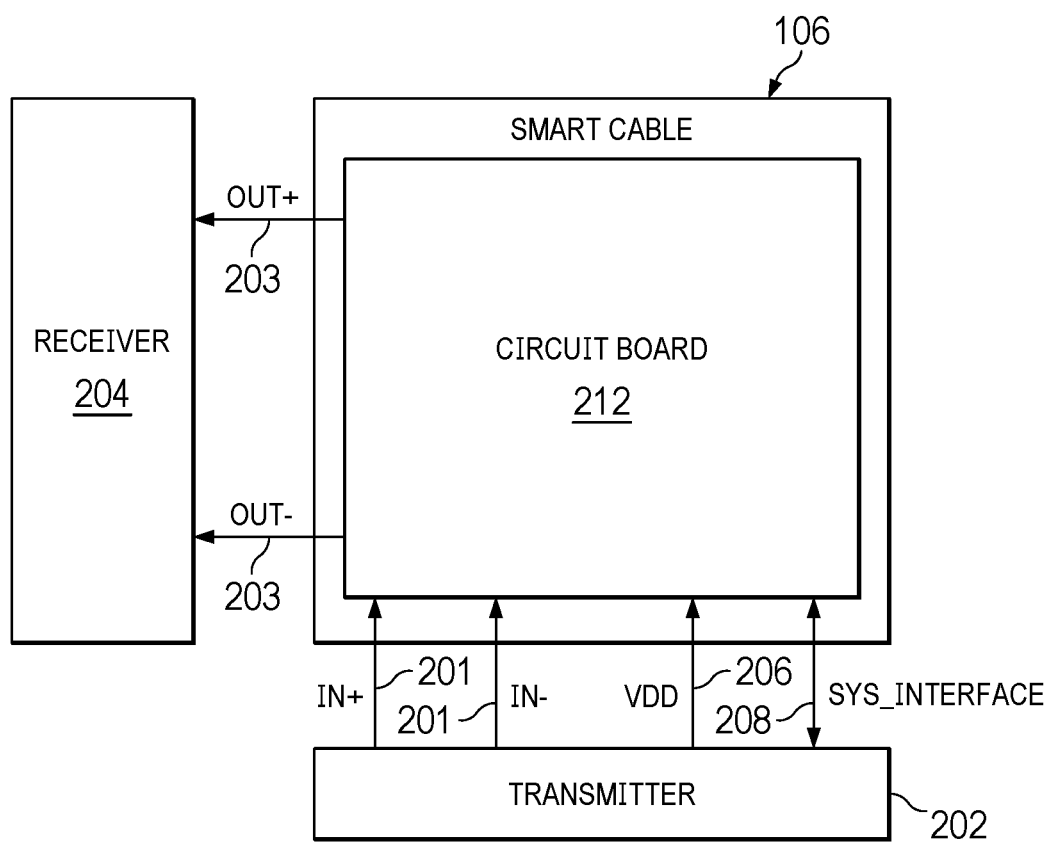
FIG. 2 illustrates a block diagram of an example subsystem comprising a transmitting device, a smart cable, and a receiving device, in accordance with embodiments of the present disclosure.
Figure 3:
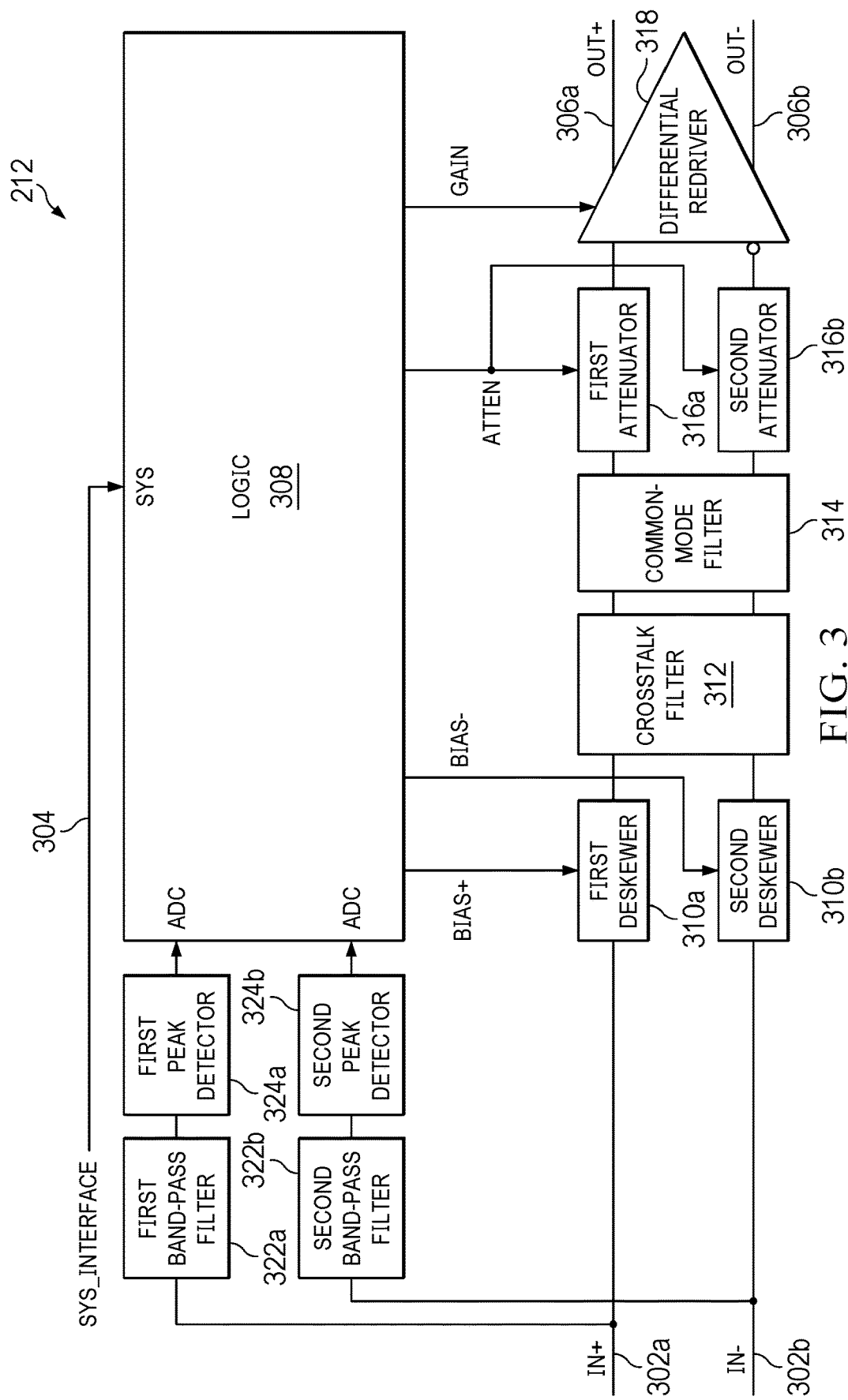
FIG. 3 illustrates selected components of an example circuit board that may be used within a smart cable, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a system 100 comprising a plurality of chassis 101, each chassis 101 comprising at least one information handling system 102, in accordance with embodiments of the present disclosure. Each chassis 101 may be an enclosure that serves as a container for various information handling systems 102 and information handling resources 104, and may be constructed from steel, aluminum, plastic, and/or any other suitable material. Although the term "chassis" is used, a chassis 101 may also be referred to as a case, cabinet, tower, box, enclosure, and/or housing. In certain embodiments, a chassis 101 may be configured to hold and/or provide power to one or more information handling systems 102 and/or information handling resources 104.

In some embodiments, one or more of information handling systems 102 may comprise servers. For example, in some embodiments, information handling systems 102 may comprise rack servers and each chassis 101 may comprise a rack configured to house such rack servers. As shown in FIG. 1, each information handling system 102 may include one or more information handling resources 104. An information handling resource 104 may include any component system, device or apparatus of an information handling system 102, including without limitation processors, service processors, basic input/output systems, buses, memories, I/O devices and/or interfaces, storage resources, network interfaces, motherboards, air movers, sensors, power supplies, and/or any other components and/or elements of an information handling system. For example, in some embodiments, an information handling resource 104 of an information handling system 102 may comprise a processor. Such processor may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in a memory and/or another information handling resource of an information handling system 102.

In these and other embodiments, an information handling resource 104 of an information handling system 102 may comprise a memory. Such a memory may be communicatively coupled to an associated processor and may include any system, device, or apparatus configured to retain program instructions and/or data for a period of time (e.g., computer-readable media). A memory may include RAM, EEPROM, a PCMCIA card, flash memory, magnetic storage, opto-magnetic storage, or any suitable selection and/or array of volatile or non-volatile memory that retains data after power to an associated information handling system 102 is turned off.

In addition to a processor and/or a memory, an information handling system 102 may include one or more other information handling resources.

As shown in FIG. 1, information handling resources 104 may be communicatively coupled to each other via a cable 106, whether such information handling resources 104 are within different information handling systems 102 in the same chassis 101, or are in different chassis 101. A cable 106 may include any suitable assembly of two or more electrically-conductive wires running side by side to carry one or more signals between information handling resources. In some embodiments, cable 106 may comprise a smart cable, as described in greater detail below.

FIG. 2 illustrates a block diagram of an example subsystem comprising a transmitter 202, smart cable 106, and a receiver 204, in accordance with embodiments of the present disclosure. Smart cable 106 as shown in FIG. 2 may be used to implement one or more cables 106 depicted in FIG. 1.

Transmitter 202 may comprise any suitable system, device, or apparatus configured to communicate a differential signal IN to receiver 204 via a smart cable 106. In addition, as shown in FIG. 2, transmitter 202 may provide a voltage rail VDD to smart cable 106 to provide electrical energy for powering functionality of circuit board 212 integral to cable 106. Further, as described in greater detail below, transmitter 202 may also be configured for bidirectional communication with circuit board 212 of smart cable 106 for communication of system information SYS INTERFACE, which may include telemetry, debug, and/or training information between transmitter 202 and circuit board 212.

Further, receiver 204 may comprise any suitable system, device, or apparatus configured to receive a differential signal OUT from transmitter 202 via smart cable 106, wherein such differential signal OUT is a function of differential signal IN as processed by smart cable 106.

For purposes of clarity and exposition, FIG. 2 contemplates only single-direction communication from transmitter 202 and receiver 204. However, in some embodiments, transceivers may be present in lieu of both of transmitter 202 and receiver 204, thus enabling bidirectional communication of bidirectional signals.

Smart cable 106 may have a plurality of wires, including communication wires 201 and 203, power wire 206, and system interface wire 208. Other wires integral to smart cable 106 may not be shown in FIG. 2 in order to aid in clarity and exposition of FIG. 2. As shown in FIG. 2, smart cable 106 may include a small printed circuit board 212 communicatively coupled to communication wires 201 and 203, power wire 206, and system interface wire 208. For example, in some embodiments, printed circuit board 212 may be approximately the size of a postage stamp. Printed circuit board 212 may be integrated within smart cable 106 in any suitable manner, including without limitation in one or more paddle boards at the ends of smart cable 106, a circuit board in the middle of the cable, or on one or more system boards to which smart cable 106 electrically couples.

Although FIG. 2 shows voltage rail VDD provided by transmitter 202 via power wire 206 for purposes of clarity and exposition, in some embodiments, such voltage rail VDD may be provided by another component of an information handling system 102 or chassis 101 in which smart cable 106 resides. In addition, although FIG. 2 shows system information SYS INTERFACE interfaced between transmitter 202 and circuit board 212 via system interface wire 208 for purposes of clarity and exposition, in some embodiments, system information SYS INTERFACE may be interfaced between circuit board 212 and a host system of an information handling system 102 (e.g., via a sideband Inter-Integrated Circuit (I2C) interface).

FIG. 3 illustrates selected components of an example circuit board 212 that may be used within smart cable 106, in accordance with embodiments of the present disclosure. As shown in FIG. 3, circuit board 212 may include a first band-pass filter 322a, a second band-pass filter 322b, a first peak detector 324a, a second peak detector 324b, logic 308, a first deskewer 310a, a second deskewer 310b, a crosstalk filter 312, a common-mode filter 314, a first attenuator 316a, a second attenuator 316b, and a differential redriver 318. Circuit board 212 may also include first input trace 302a, second input trace 302b, system interface trace 304, first output trace 306a, and second output trace 306b.

First band-pass filter 322a may receive first polarity input signal IN+ via first input trace 302a and may be configured to select a particular frequency (e.g., the Nyquist frequency) of first polarity input signal IN+. In other words, first band-pass filter 322a may filter first polarity input signal IN+ to include only a frequency band near the particular frequency. Similarly, second band-pass filter 322b may be configured to select the particular frequency of second polarity input signal IN−. In other words, second band-pass filter 322b may filter second input signal IN− to include only a frequency band near the particular frequency.

First peak detector 324a may be configured to receive the output of first band-pass filter 322a and measure a first amplitude of first polarity input signal IN+ at the particular frequency. Similarly, second peak detector 324b may be configured to receive the output of second band-pass filter 322b and measure a second amplitude of second polarity input signal IN− at the particular frequency.

Logic 308 may comprise any suitable system, device, or apparatus configured to perform functionality of logic 308 described below. Thus, logic 308 may include a microprocessor, microcontroller, digital signal processor (DSP), application specific integrated circuit (ASIC), or another digital or analog circuitry configured to interpret and/or execute program instructions and/or process data. In some embodiments, logic 308 may include a program of executable instructions embodied on computer-readable media and configured to execute on a processing device to carry out the functionality of logic 308.

Logic 308 may be configured to receive the measurements of the first amplitude of first polarity input signal IN+ at the particular frequency and the second amplitude of second polarity input signal IN− at the particular frequency and perform processing to generate control signals for first deskewer 310a, second deskewer 310b, first attenuator 316a, second attenuator 316b, and differential redriver 318, as described below.

For example, a difference in the amplitudes of first polarity input signal IN+ at the particular frequency and second polarity input signal IN− at the particular frequency may be indicative of a signal skew of the differential pair of signals. In particular, the difference between amplitudes of first polarity input signal IN+ and second polarity input signal IN− may be proportional to the signal skew of the differential pair of signals. Accordingly, based on the difference, logic 308 may be configured to generate control signals, in particular first bias signal BIAS+ and second bias signal BIAS−, based on the difference of the first amplitude and the second amplitude to adjust speed and/or timing of one or both of first polarity input signal IN+ and second polarity input signal IN−. In some embodiments, such generation of first bias signal BIAS+ and second bias signal BIAS− may be in accordance with the systems and methods disclosed in either or both of U.S. patent application Ser. No. 18/314,216 filed May 9, 2023 (the "216 Application") and U.S. patent application Ser. No. 18/448,380 filed Aug. 11, 2023 (the "'380 Application"), both of which are incorporated by reference herein in their entireties.

First deskewer 310a may modify a propagation delay of the signal path of first polarity input signal IN+ as a function of first bias signal BIAS+. For example, as a delay of first polarity input signal IN+ relative to second polarity input signal IN− increases, first bias signal BIAS+ may increase, decreasing a propagation delay of the signal path of first polarity input signal IN+. As another example, as the delay of first polarity input signal IN+ relative to second polarity input signal IN− decreases, first bias signal BIAS+ may decrease, increasing a propagation delay of first polarity input signal IN+.

Similarly, second deskewer 310b may modify a propagation delay of the signal path of second polarity input signal IN− as a function of second bias signal BIAS−. For example, as a delay of second polarity input signal IN− relative to first polarity input signal IN+ increases, second bias signal BIAS− may increase, decreasing a propagation delay of the signal path of second polarity input signal IN−. As another example, as the delay of second polarity input signal IN− relative to first polarity input signal IN+ decreases, second bias signal BIAS− may decrease, increasing a propagation delay of second polarity input signal IN−.

In some embodiments, such modification of the propagation delay of the signal path of first polarity input signal IN+ as a function of first bias signal BIAS+ and modification of the propagation delay of the signal path of second polarity input signal IN− as a function of first bias signal BIAS− may be in accordance with those systems and methods disclosed in either or both of the '216 Application or the '380 Application.

As a result, increases and decreases to the propagation delays of the signal path of first polarity signal IN+ and the signal path of second polarity input signal IN− responsive to the presence of skew may compensate for such skew.

Crosstalk filter 312 may comprise any suitable electromagnetic coupler device configured to mitigate or eliminate capacitive crosstalk between the signal path of first polarity signal IN+ and the signal path of second polarity input signal IN−. In some embodiments, crosstalk filter 312 may be in accordance with the systems and methods disclosed in U.S. patent application Ser. No. 17/451,969 filed Oct. 22, 2021 (the "'969 Application"), which is incorporated by reference herein in its entirety. Accordingly, in operation, crosstalk filter 312 may receive the differential signal output from first deskewer 310a and second deskewer 310b and generate a resulting differential signal in which any crosstalk present between the positive and negative polarity components of the differential signal may be mitigated or eliminated.

Common-mode filter 314 may comprise any suitable system, device, or apparatus configured to mitigate or eliminate the presence of common mode noise on the signal paths of first polarity signal IN+ and second polarity input signal IN−. For example, in some embodiments, common-mode filter 314 may be implemented using a common-mode choke. As another example, in other embodiments, common-mode filter 314 may be implemented using a ground trace between traces of the differential signal paths of first polarity signal IN+ and second polarity input signal IN−, as set forth in the systems and methods described in U.S. patent application Ser. No. 17/726,189 filed Apr. 21, 2021 (the "189 Application"), which is incorporated by reference herein in its entirety. Accordingly, in operation, common-mode filter 314 may receive the differential signal output from crosstalk filter 312 and generate a resulting differential signal in which any common-mode noise present in the differential signal may be mitigated or eliminated.

There may be instances when a channel has very low loss (e.g., due to a short cable). In such cases, first polarity input signal IN+ and second polarity input signal IN− may be very strong and may potentially create excessive crosstalk, may overdrive a receiver input, and/or may cause other undesirable issues. Thus, logic 308 may be configured to generate a control signal, in particular attenuation signal ATTEN, based on the first amplitude and the second amplitude (e.g., based on an average of the first amplitude and the second amplitude). First attenuator 316a may modify an attenuation of the signal path of first polarity input signal IN+ as a function of attenuation signal ATTEN. Similarly, second attenuator 316b may modify an attenuation of the signal path of second polarity input signal IN− as a function of attenuation signal ATTEN. For example, as the first amplitude and/or the second amplitude increase, attenuation signal ATTEN may increase, increasing attenuation of the signal paths of first polarity input signal IN+ and second polarity input signal IN−. As another example, as the first amplitude and/or the second amplitude decrease, attenuation signal ATTEN may decrease, decreasing attenuation of the signal paths of first polarity input signal IN+ and second polarity input signal IN−.

In some embodiments, such modification of the variable attenuation of the signal path of first polarity input signal IN+ as a function of first attenuation signal ATTEN and modification of the variable attenuation of the signal path of second polarity input signal IN− as a function of first attenuation signal ATTEN may be in accordance with those systems and methods disclosed in the '643 Application.

Differential redriver 318 may comprise an amplifier with a variable gain GAIN, controlled by logic 308. In some embodiments, logic 308 may set variable gain GAIN based on cable properties pre-stored in logic 308 or memory accessible by logic 308. In other embodiments, logic 308 may set variable gain GAIN based on measurements from first peak detector 324a and/or second peak detector 324b, to ensure that the differential output signal generated from smart cable 106 (and thus received by receiver 204) is properly conditioned for processing by receiver 204.

As mentioned above, logic 308 may be configured to receive information (e.g., training information for logic 308, etc.) from and/or transmit information (e.g., telemetry information, debug information, etc. from logic 308) to transmitter 202, a host system of an information handling system 102, and/or another component.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A cable, comprising:
   a first signal path for communicating a first polarity signal of a differential signal;
   a second signal path for communicating a second polarity signal of the differential signal;
   a first deskewer integral to the first signal path and configured to vary a first propagation delay of the first signal path;
   a second deskewer integral to the second signal path and configured to vary a second propagation delay of the second signal path;
   a first attenuator integral to the first signal path and configured to apply an attenuation to the first signal path;
   a second attenuator integral to the second signal path and configured to apply the attenuation to the second signal path; and
   a circuit formed as a part of the cable and communicatively coupled to the first signal path, the second signal path, the first deskewer, the second deskewer, the first attenuator, and the second attenuator, and configured to, based on analysis of the first polarity signal and the second polarity signal, control the first propagation delay, the second propagation delay, and the attenuation.

2. The cable of claim 1, further comprising a differential redriver configured to apply a gain to the differential signal.

3. The cable of claim 2, wherein the circuit is configured to control the gain based on analysis of the first polarity signal and the second polarity signal.

4. The cable of claim 1, further comprising:
   a crosstalk filter electrically coupled to the first signal path and the second signal path and configured to compensate for capacitive crosstalk between the first signal path and the second signal path; and
   a common-mode filter electrically coupled to the first signal path and the second signal path and configured to compensate for common-mode noise present in the first signal path and the second signal path.

5. The cable of claim 1, wherein the circuit is further configured to control the first propagation delay and the second propagation delay based on a difference between amplitudes of the first polarity signal and the second polarity signal within a particular frequency band.

6. The cable of claim 1, wherein the circuit is further configured to control the attenuation based on amplitudes of the first polarity signal and the second polarity signal.

7. The cable of claim 1, wherein the circuit is further configured to communicate system information regarding the cable to a host system of an information handling system.

8. A system comprising:
   a transmitter;
   a receiver; and
   a cable communicatively coupled between the transmitter and the receiver and comprising:
      a first signal path for communicating a first polarity signal of a differential signal from the transmitter to the receiver;
      a second signal path for communicating a second polarity signal of the differential signal from the transmitter to the receiver;
      a first deskewer integral to the first signal path and configured to vary a first propagation delay of the first signal path;
      a second deskewer integral to the second signal path and configured to vary a second propagation delay of the second signal path;
      a first attenuator integral to the first signal path and configured to apply an attenuation to the first signal path;
      a second attenuator integral to the second signal path and configured to apply the attenuation to the second signal path; and
      a circuit formed as a part of the cable and communicatively coupled to the first signal path, the second signal path, the first deskewer, the second deskewer, the first attenuator, and the second attenuator, and configured to, based on analysis of the first polarity signal and the second polarity signal, control the first propagation delay, the second propagation delay, and the attenuation.

9. The system of claim 8, the circuit further comprising a differential redriver configured to apply a gain to the differential signal.

10. The system of claim 9, wherein the circuit is configured to control the gain based on analysis of the first polarity signal and the second polarity signal.

11. The system of claim 8, the cable further comprising:
a crosstalk filter electrically coupled to the first signal path and the second signal path and configured to compensate for capacitive crosstalk between the first signal path and the second signal path; and
a common-mode filter electrically coupled to the first signal path and the second signal path and configured to compensate for common-mode noise present in the first signal path and the second signal path.

12. The system of claim 8, wherein the circuit is further configured to control the first propagation delay and the second propagation delay based on a difference between amplitudes of the first polarity signal and the second polarity signal within a particular frequency band.

13. The system of claim 8, wherein the circuit is further configured to control the attenuation based on amplitudes of the first polarity signal and the second polarity signal.

14. The system of claim 8, wherein the circuit is further configured to communicate system information regarding the cable to a host system of an information handling system.

15. A method comprising, in a cable having a first signal path for communicating a first polarity signal of a differential signal from a transmitter to a receiver, a second signal path for communicating a second polarity signal of the differential signal from the transmitter to the receiver, a first deskewer integral to the first signal path and configured to vary a first propagation delay of the first signal path, a second deskewer integral to the second signal path and configured to vary a second propagation delay of the second signal path, a first attenuator integral to the first signal path and configured to apply an attenuation to the first signal path, and a second attenuator integral to the second signal path and configured to apply the attenuation to the second signal path, controlling, based on analysis of the first polarity signal and the second polarity signal, with a circuit formed as a part of the cable and communicatively coupled to the first signal path, the second signal path, the first deskewer, the second deskewer, the first attenuator, and the second attenuator:
the first propagation delay;
the second propagation delay; and
the attenuation.

16. The method of claim 15, further comprising applying, with the circuit, a gain to the differential signal.

17. The method of claim 16, further comprising controlling, by the circuit, the gain based on analysis of the first polarity signal and the second polarity signal.

18. The method of claim 15, wherein the cable further comprises:
a crosstalk filter electrically coupled to the first signal path and the second signal path and configured to compensate for capacitive crosstalk between the first signal path and the second signal path; and
a common-mode filter electrically coupled to the first signal path and the second signal path and configured to compensate for common-mode noise present in the first signal path and the second signal path.

19. The method of claim 15, further comprising controlling, by the circuit, the first propagation delay and the second propagation delay based on a difference between amplitudes of the first polarity signal and the second polarity signal within a particular frequency band.

20. The method of claim 15, further comprising controlling, by the circuit, the attenuation based on amplitudes of the first polarity signal and the second polarity signal.

21. The method of claim 15, further comprising communicating, by the circuit, system information regarding the cable to a host system of an information handling system.

* * * * *